United States Patent
Buné

(10) Patent No.: US 7,162,683 B2
(45) Date of Patent: Jan. 9, 2007

(54) ITERATIVE METHOD OF DECODING A RECEIVED SIGNAL

(75) Inventor: Paul Buné, Kornwestheim (DE)

(73) Assignee: Alcatel, Paris (FR)

( * ) Notice: Subject to any disclaimer, the term of this patent is extended or adjusted under 35 U.S.C. 154(b) by 483 days.

(21) Appl. No.: 10/114,281

(22) Filed: Apr. 3, 2002

(65) Prior Publication Data

US 2002/0147948 A1    Oct. 10, 2002

(30) Foreign Application Priority Data

Apr. 9, 2001  (EP)  ................................. 01440100

(51) Int. Cl.
*H03M 13/00* (2006.01)
*H03M 13/03* (2006.01)

(52) U.S. Cl. .................. 714/794; 714/774; 714/776

(58) Field of Classification Search ............... 714/794, 714/795, 774, 776
See application file for complete search history.

(56) References Cited

U.S. PATENT DOCUMENTS

| | | | |
|---|---|---|---|
| 6,697,986 B1 * | 2/2004 | Kim et al. ................. | 714/751 |
| 6,732,302 B1 * | 5/2004 | Palenius et al. ............. | 714/48 |
| 6,763,244 B1 * | 7/2004 | Chen et al. ................ | 455/522 |
| 6,765,887 B1 * | 7/2004 | Shiu et al. ................. | 370/329 |

FOREIGN PATENT DOCUMENTS

EP   0 973 292 A2   1/2000

OTHER PUBLICATIONS

3GPP TS 25.212 version 3.1.1, Multiplexing and channel coding [FDD], Dec. 1999.*
Yue C-W et al.: "On the FER Performance and Decoding Complexity of Turbo Codes", 1999 IEEE 49th. Vehicular Technology Conference., Houston, TX, May 16-20, 1999, IEEE Vehicular Technology Conference, New York, NY: IEEE, US, Bd. 3 Conf. 49, May 16, 1999, pp. 2214-2221.
Shibutani A et al: "Complexity Reduction of Turbo Decoding" VTC 1999—Fall. IEEE VTS 50th. Vehicular Technology Conference. Gateway to the 21st Century Communications Village. Amsterdam, Sep. 19-22, 1999, IEEE Vehicular Technology Conference, New York, NY: IEEE, US. Bd. 3 Conf. 50, Sep. 19, 1999, pp. 1570-1574.
Ambroze A et al.: "Practical aspects of iteractive decoding" IEEE Proceedings: Communications, Institution of Electrical Engineers, GB, Bd. 147, Nr. 2, Apr. 14, 2000, pp. 69-74.

* cited by examiner

*Primary Examiner*—Joseph Torres
(74) *Attorney, Agent, or Firm*—Sughrue Mion, PLLC (57) ABSTRACT

An iterative method and a device for decoding received signals transmitted in data frames via various channels. In order to be able to utilize the computing capacity of digital signal processors (DSPs) as efficiently as possible, it is proposed that, starting at a first channel, the quality of the decoded signal transmitted via the first channel is checked following every iteration and switchover takes place to at least one further channel if a specifiable switchover condition exists. The switchover condition may, for example, be a specifiable quality of the decoded signal transmitted via the channel under consideration. To determine the quality of the decoded signal a cyclic redundancy check (CRC), in particular, is proposed following every iteration.

1 Claim, 7 Drawing Sheets

ITERATIVE METHOD OF DECODING A RECEIVED SIGNAL

BACKGROUND OF THE INVENTION

The present invention relates to an iterative method of decoding a received signal transmitted in data frames.

The invention relates, in addition, to an iterative method of decoding received signals transmitted in data frames via various channels.

Furthermore, the present invention relates to a device for decoding received signals by means of an iterative method.

The invention also relates to a device for receiving received signals transmitted in data frames with at least one device for decoding the received signals by means of an iterative method.

The invention furthermore relates to a base station of a radio telecommunications system having a multiplicity of mobile-radio units, having at least one further base station, the base stations being in radio contact with the mobile-radio units, and at least one control device for controlling the radio telecommunications system that is in contact with the base stations.

Finally, the present invention relates to a radio telecommunications system having a multiplicity of mobile-radio units, having a plurality of base stations that are in radio contact with the mobile-radio units, and having at least one control device for controlling the radio telecommunications system that is in contact with the base stations.

The invention is based on a priority application EP 01 440 100.4 which is hereby incorporated by reference.

Figure 2:
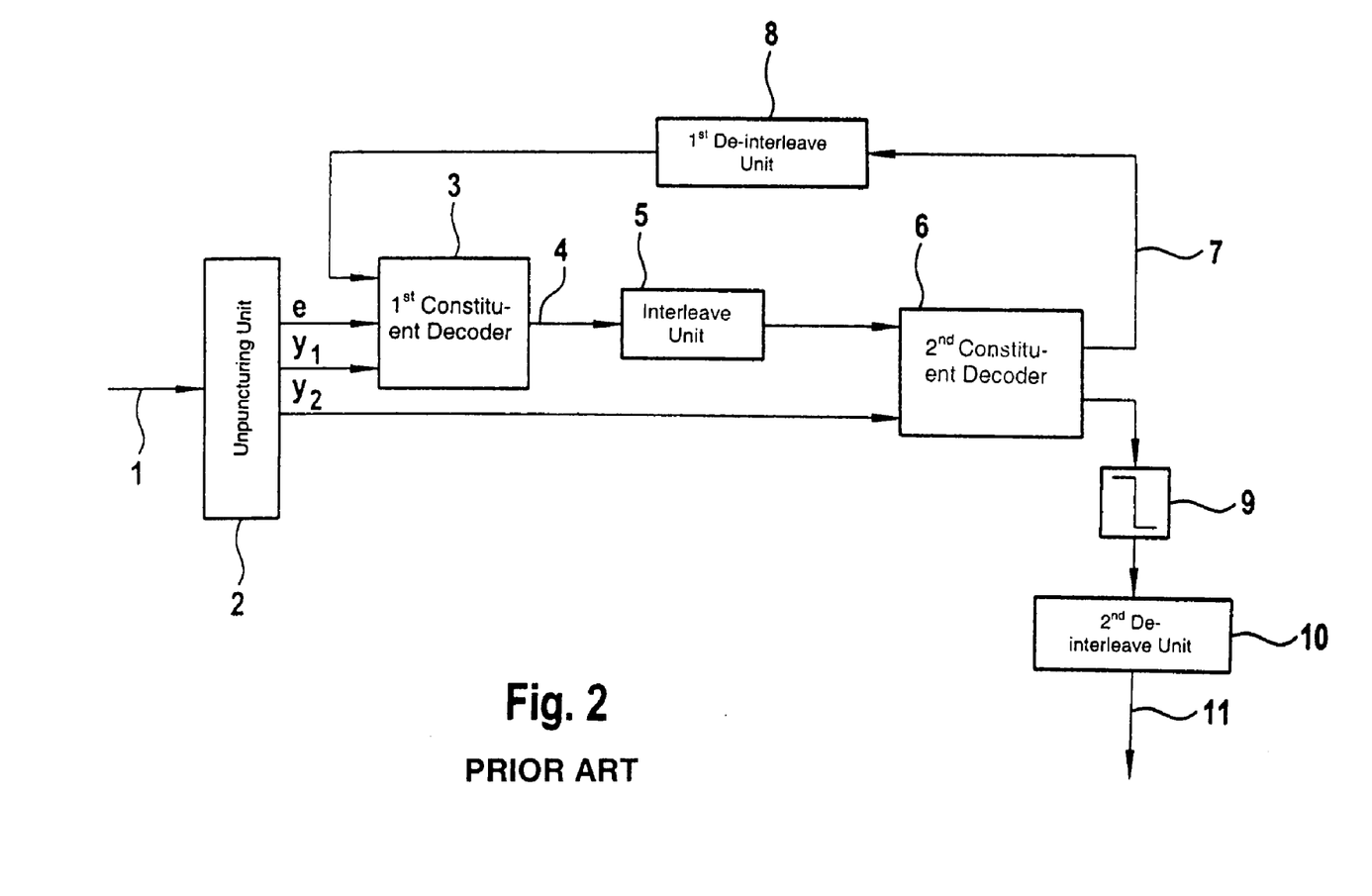
FIG. 2 shows a block diagram of a decoding device known from the prior art.

Decoding methods of the type mentioned at the outset are used in the prior art, for example in decoding devices of base stations of radio telecommunications systems. FIG. 2 shows a block diagram of a known so-called turbo decoder, such as is used, for example, for decoding a channel in a node B of UMTS (Universal Mobile Telecommunications System) radio telecommunications systems. More detailed items of information on the known turbo decoder can be found in 3-GPP (3rd Generation Partnership Project) specification 25.212 V.3.4.0, to which reference is expressly made. A received signal applied to the turbo decoder is denoted by the reference symbol 1. The input signal is transmitted in data frames according to a CDMA (code division multiple access) method. It is first fed to a so-called unpuncturing unit 2, which matches the received signal 1 transmitted in the data frames to specified data frames of the decoder. This is done, for example, by adding bits omitted in the frame of the data transmission. The added bits have the amplitude zero. They are treated in the decoding frame as bits having a low reliability and weighted low according to the amplitude. The unpuncturing is part of a so-called rate matching. Generated by the unpuncturing unit 2 are an output signal e and two redundancy signals $y_1$, $y_2$ for the purpose of error correction.

The output signal e and the first redundancy signal $y_1$ are fed to a first so-called constituent decoder 3 having a so-called soft output at the output 4. A soft output means that the entire bandwidth of real numbers can be applied to the output 4 instead of, as in the case of the so-called hard output, where only +1, −1 (physical bits) or 0, 1 (logic bits) may be applied at the output. As a result, errors in the decoding of a transmitted received signal subject to interference are reduced. In the case of the soft output, the bits have various amplitudes corresponding to their reliability and are weighted according to their amplitude.

Used as constituent decoders are, typically, decoders of the MAP (maximum a posteriori) type or, for example of the LogMAP, MaxLogMAP, SOVA or Viterbi types.

The output 4 of the decoder 3 is fed to an interleave unit 5, which rearranges the bits within the data frames so that originally adjacent bits are as far away from one another as possible. In this connection, it is assumed that errors in the transmission of the received signal affect not only individual bits but, as a rule, a multiplicity of consecutive bits. Whereas the decoding of a data frame containing occasionally occurring defective bits is possible in a relatively problem-free manner, decoding of a data frame having a multiplicity of consecutive defective bits is very expensive or even impossible. For this reason, the bits are rearranged by the interleave unit 5 in order to generate a data frame containing defective bits that occur only occasionally and that can readily be decoded despite a transmission error that occurs in an accumulated manner and that affects a multiplicity of consecutive bits.

The output of the interleave unit 5 is fed, together with the second redundancy signal $y_2$, to a second constituent decoder 6. From the point of view of structure, the latter corresponds to the first constituent decoder 3. According to the prior art, the output of the second constituent decoder 6 is regularly fed back eight times via a feedback 7 and a de-interleave unit 8 disposed therein to the input of the first constituent decoder 3. After eight iterations have taken place, the output of the second constituent decoder 6 is emitted via a threshold detector 9 and a further de-interleave unit 10. The output 11 of the further de-interleave unit 10 is the decoded signal (the so-called estimated hard bits).

Turbo decoding involving eight iterations of a received signal that is transmitted via a 384 kbit/s data channel requires a computing capacity of $78 \times 10^6$ instructions/s (78 Mips). At a clock rate of 180 Hz and 60% capacity utilization, a conventional digital signal processor (DSP) of the TigerSHARC type can make available about $108 \times 10^6$ instructions/s (108 Mips). Consequently, according to the prior art, a maximum of 384 kbit/s data channel can be decoded by a DSP.

SUMMARY OF THE INVENTION

The object of the present invention is therefore to reduce the loading of a digital signal processor for decoding received signals transmitted in data frames.

Proceeding from the iterative method of decoding a received signal transmitted in data frames, the invention proposes, to achieve this object, that the quality of the decoded signal is checked following every iteration and the method is terminated if the decoded signal has a specifiable quality.

According to the invention, therefore, it is proposed not always to perform a specified number of iterations in an iterative decoding method. If the decoded signal has a specifiable quality even after a lesser number of iterations than the specified number, the method of decoding the part of the received signal contained in a data frame is already terminated, according to the invention, before all the specified iterations have been run.

The method according to the invention is able to reduce considerably the loading of digital signal processors (DSPs) for the decoding of received signals transmitted in the data frame. Experiments in a UMTS radio telecommunications system have shown that, with an assumed mean interference of the received signal of about 1 dB, the plurality of data frames is already error-free even after two iterations or less, whereas, with a data frame error rate (block error rate, BLER) of about 1% or less, there is talk of freedom from error after eight iterations. In the case of turbo decoders that are used in a node B of a UMTS radio telecommunications system, the method according to the invention can reduce the capacity utilization of the DSPs by about 70%, given an assumed signal-to-interference ratio (SIR) of the received signal of about 1 dB.

The marked reduction of the capacity utilization of the DSPs as a result of the method according to the invention has various advantages. On the one hand, lower performance and, consequently, markedly less expensive DSPs can be used in a decoding device because of the reduced capacity utilization. In accordance with another approach, the same high-performance DSPs can also be used as before, but the DSPs are given other tasks at the times at which they are not decoding the received signal, that is to say are in a so-called idle state, and can consequently reduce the loading of other processors in the decoding device.

In this connection, for example, the design of the decoding device as a so-called packet machine having its own control unit, a so-called scheduler, would be conceivable. The scheduler allocates the decoding of a certain data frame to a DSP in the decoding device that is currently in an idle state. In the case of a decoding device constructed as a packet machine, the number of DSPs provided in the decoding device for decoding received signals can be reduced, but, at the same time, the full functionality of the decoding device is retained.

In accordance with an advantageous development of the present invention, it is proposed that a cyclic redundancy check (CRC) is performed for every decoded data frame following every iteration and the method is terminated if the decoded data frame is error-free. CRC is a method of checking the freedom from error of a signal transmitted digitally via a communications link. In a transmitting unit, CRC bits are generated by processing the data to be transmitted in accordance with a CRC algorithm. The result of the CRC algorithm is stored in so-called CRC bits that are transmitted together with the data to be transmitted. The receiving unit performs the same CRC algorithm on the received data and compares the result of the CRC algorithm with the received CRC bits. If they do not match, a transmission error has occurred and the receiving unit can initiate, for example, a repeat transmission of the data. As used in decoding devices of a node B of a UMTS radio telecommunications system, turbo decoders have, as standard, a facility for performing a CRC on the received signal. In accordance with the present development, use is made of this facility for every decoded data frame following every iteration that is run in the framework of the decoding method. If the result of the CRC algorithm matches the CRC bits, the method is terminated.

Proceeding from an iterative method of decoding received signals transmitted in data frames via various channels, it is proposed, as a further achievement of the object, that, starting with a first channel, the quality of the decoded signals transmitted via the first channel are checked following every iteration and a switchover takes place to at least a further channel if a specifiable switchover condition exists.

The specifiable switchover condition may, for example, exist if the decoded signal transmitted via the channel under consideration has a specifiable quality. In this case, it is proposed, in accordance with a development of the present invention, that a switchover takes place to at least one further channel. As a result, the same DSP can be used to decode a first data frame that is transmitted via the first channel and at least one further data frame that is transmitted via the at least one further channel. How many different data frames can be decoded within an interval of time under consideration (so-called transmission timing interval frame, TTI frame) by a DSP depends, on the one hand, on the computing capacity of the DSP and, on the other hand, on the number of iterations that have to be performed to decode preceding data frames within the same TTI frame.

In accordance with a preferred embodiment of the present invention, it is proposed that a cyclic redundancy check (CRC) is performed for every decoded data frame of the channel under consideration following every iteration and a switchover takes place to the at least one further channel if the decoded data frame transmitted via the channel under consideration is error-free.

Advantageously, a switchover takes place to a further channel although the decoded signal transmitted via the channel under consideration does not have the specifiable quality if a specifiable first number of iterations has been performed for a data frame of the channel under consideration. If, for example, a maximum of eight iterations is provided for decoding a data frame transmitted via a certain channel, the method is terminated after eight unsuccessful iterations. This termination of the decoding of the data frame transmitted via the channel under consideration prevents an excessive computational loading of the DSP, for example in the event of particularly severe interference in the input signal, and makes it possible to use computing capacities still remaining on the DSP within the TTI frame for decoding data frames transmitted via further channels. The termination of the decoding for the data frame transmitted via the channel under consideration means that said data frame can either not be decoded at all because, for example, it has interference within the framework of the radio transmission exceeding the so-called Shannon theorem, or cannot be decoded with acceptable effort. The Shannon theorem is an upper limit of the degree of interference in a signal at which interference suppression in the signal is still just theoretically possible.

Instead of decoding first one channel with a plurality of consecutive iterations and only thereafter switching over to further channels in order to decode them in turn in each case individually in consecutive iterations, it is also conceivable to switch over after every iteration to a further channel of a group of channels and to terminate the decoding of a channel if the decoded signal transmitted via the channel under consideration has a specifiable quality. In that case, a switchover takes place only between the remaining channels of the group. Accordingly, it is proposed, as a further advantageous development of the present invention that, starting with a first channel, switchover between the first channel and at least one further channel takes place following an iteration cyclically in each case for a certain number of iterations until the decoded signal transmitted via the channel under consideration has a specifiable quality.

In accordance with a preferred embodiment of the invention, it is proposed that for every decoded data frame of the channel under consideration, a cyclic redundancy check (CRC) is performed following every iteration and switchover takes place between the first channel and the at least one further channel until the decoded data frame transmitted via the channel under consideration is error-free.

Preferably, following every iteration, a switchover takes place cyclically in each case for an iteration between the first channel and the at least one further channel.

In accordance with a further preferred embodiment of the present invention, it is proposed that the method is terminated if the decoded signal transmitted via a specifiable further channel has a specifiable quality. If a DSP, for example, is used to decode a maximum of five channels, the decoding method is terminated if the data frame transmitted via the fifth channel is also error-free. The DSP is then in the idle state and is available for other calculations.

Preferably, the method is terminated although the decoded signal transmitted via the channel under consideration does not have the specifiable quality if a specifiable second number of iterations has been performed for the data frames of the first and the further channels. If in total a maximum of ten iterations are available for decoding data frames transmitted via various channels within a TTI frame, the method is terminated after ten iterations, the data frame of a first channel having been successfully decoded after six iterations, but the four iterations remaining within the TTI frame have not been sufficient for decoding a further data frame.

The method according to the invention can start decoding the data frame transmitted via a channel at any desired channel. It has been found, however, that the efficiency of decoding can be increased markedly yet again if certain criteria are taken into account in selecting the first channel. Therefore, in accordance with another advantageous development of the present invention, it is proposed that of a specifiable number of channels, that channel is selected as first channel via which the signal is transmitted with the best quality factor. In this connection, it is assumed that the decoding of such a signal having a high quality factor requires only very few iterations until the decoded signal has the specifiable quality. The relatively long computation time of the DSP remaining within the TTI frame can then be fully used to decode a data frame transmitted via a further channel. The probability of a successful decoding of the further data frame is relatively high, even if it contains strong interference and requires a relatively large number of iterations for decoding since, because of the rapid decoding of the first data frame within the TTI frame, a large computing capacity is still available in the DSP.

It is conceivable to determine the quality factor of the signals of the specifiable number of channels on the basis of an analysis of the amplitude variations at the input of the decoding device. In accordance with a preferred embodiment of the invention, it is proposed that the quality factor of the signals of the specifiable number of channels is determined on the basis of a signal-to-interference ratio (SIR) of the signals.

In accordance with a further preferred embodiment of the invention, it is proposed that the quality factor of the signals of the specifiable number of channels is determined on the basis of a bit error rate of bits in a control channel of the signals. Preferably, the quality factor of the signals of the specifiable number of channels is determined on the basis of a bit error rate of pilot bits in a dedicated physical control channel (DPCCH) of the signals. A data channel of a UMTS radio telecommunications system is described as a data channel (DCH). The data channel comprises a dedicated physical data channel (DPDCH) and the dedicated physical control channel (DPCCH). This involves the individual channels assigned to the terminals. The DPDCH is subdivided yet again into a dedicated traffic channel (DTCH) and a designated control channel (DCCH). The DPDCH is transmitted about once every 20 to 40 msec. The DPCCH contains the pilot bits for synchronization and further bits. The DPCCH is transmitted approximately 1,500 times per second. The pilot bits are an important index of the quality factor of the transmission signals.

Proceeding from the device for decoding input signals by means of an iterative method, it is proposed, as yet a further achievement of the object of the invention, that the decoding device has means for performing the method according to the invention.

In accordance with an advantageous development of the present invention, it is proposed that the decoding device has at least two constituent decoders connected in series, an interleave unit disposed in each case between two constituent decoders, a feedback of an output of the last constituent decoder at an input of the first constituent decoder and a de-interleave unit disposed in the feedback. Such a decoding device is described as a turbo decoder and is used, in particular, in a receiving device in a node B of a UMTS radio communications system.

Proceeding from the device for receiving received signals transmitted in data frames of the type mentioned at the outset, it is proposed, as a further achievement of the object of the invention, that the decoding device has means for performing the method according to the invention. Such a receiving device is present in the case of a UMTS radio telecommunications system in a node B for receiving signals of the mobile-radio units (so-called uplink).

Proceeding from the base station of a radio telecommunications system of the type mentioned at the outset, it is proposed, as yet a further achievement of the present invention that the base station has at least one device for receiving a received signal transmitted in data frames with a decoding device for decoding the signal by means of an iterative method. Such a base station is described in a UMTS radio telecommunications system as node B.

Finally, proceeding from the radio telecommunications system of the type mentioned at the outset, it is proposed as an achievement of the object of the present invention that at least one of the base stations of the radio communications system is constructed as a base station. The mobile-radio units of the radio telecommunications system are, for example, constructed as mobile telephones. In a UMTS radio telecommunications system, the base stations are described as node B and the control device as radio network controller (RNC).

In accordance with an advantageous development of the present invention, it is proposed that a mobile-radio unit is in radio contact with a plurality of base stations, the base stations that are in radio contact with the mobile-radio unit transmit the quality factor of the radio link to the control device, the control device communicates items of information about the quality factor of the radio links to the base stations and the base stations use said items of information in performing the method according to the invention. The state in which a mobile-radio unit is in radio contact with a plurality of base stations is also described as soft handover. As a result of the fact that the items of information about the quality factor of the radio links to all the base stations with which the mobile-radio unit is in contact is available in the individual base stations, every individual base station knows whether the radio link with which it is in radio contact with the mobile-radio unit tends to be good or tends to be bad. Said items of information can then be used in the individual base stations within the framework of performing the method according to the invention at various points. Thus, a base station may, for example, decode the signal received via the radio link from the mobile-radio unit with higher priority if it knows that it is maintaining the radio link having the best quality factor to the mobile-radio unit. Equally, a base station that is maintaining a radio link having a quality factor that tends to be poorer to the mobile-radio unit may treat the decoding of the radio signal with a priority that tends to be lower.

In accordance with an advantageous development of the present invention, it is proposed that the base stations use the items of information about the quality factor of the radio links to select the first channel from a specifiable number of channels. The radio link via which the received signal is transmitted with a particularly high quality factor is therefore decoded with the highest priority. If the DSP then still has computing capacity free, lower-priority received signals can be decoded.

According to a preferred embodiment of the present invention, it is proposed that the base stations use the items of information about the quality factor of the radio links to select the sequence of further channels from a specifiable number of channels.

In accordance with a further preferred embodiment of the present invention, it is proposed that the base stations use the items of information about the quality factor of the radio links to select the instant in time of a change to a further channel.

Finally, in accordance with yet a further preferred embodiment of the invention, it is proposed that the base stations use the items of information about the quality factor of the radio links to select the instant in time of a termination of the method.

BRIEF DESCRIPTION OF THE DRAWINGS

Further features, possible applications and advantages of the invention emerge from the description below of the exemplary embodiments of the invention that are shown in the drawing. In this connection, all the features described or presented separately or in any combination form the subject of the invention, regardless of their inclusion in the patent claims or of their back-reference and also regardless of their formulation or presentation in the description or in the drawing.

In the drawing.

Figure 1:
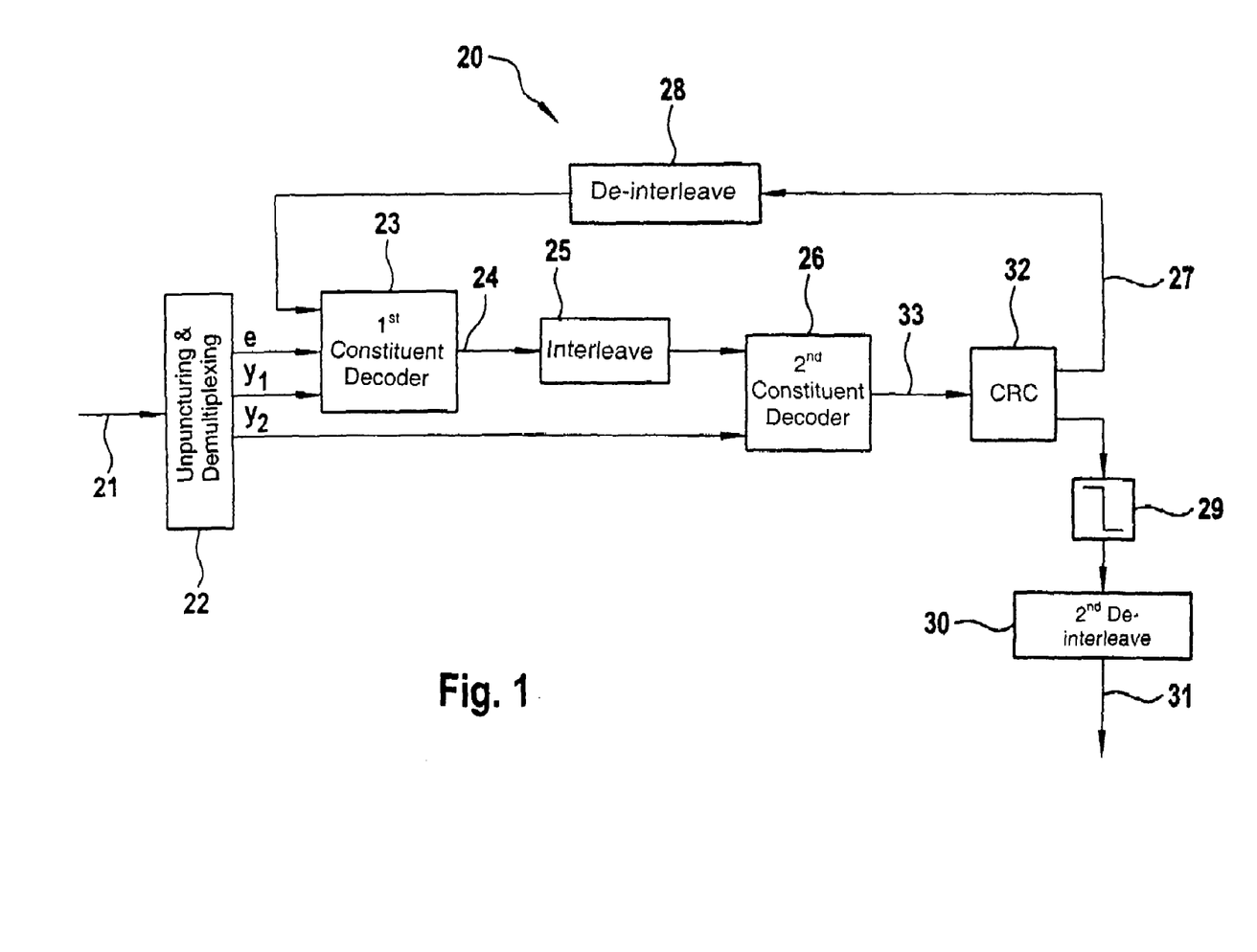
FIG. 1 shows a block diagram of a decoding device according to the invention.

FIG. 1 shows a block diagram of a decoding device according to the invention in accordance with a preferred embodiment. The decoding device is denoted in its entirety by the reference symbol 20. An input signal transmitted in data frames and applied to the decoding device 20 is denoted by the reference symbol 21. The input signal 21 is, for example, an uplink signal of a mobile radio unit of a radio telecommunications system that is received in a base station of the radio telecommunications system. The input signal 21 is applied to an unpuncturing and demultiplexing unit 22, which generates an output signal e and two redundancy signals $y_1$, $y_2$ for the purpose of error correction. The output signal e and the first redundancy signal $y_1$ are applied to a first constituent decoder 23, which is constructed, for example, as a Viterbi decoder. It may, however, also be constructed as a so-called MAP, Log-MAP or MaxLogMAP decoder. An output 24 of the first decoder 23 is fed to an interleave unit 25. An output of the interleave unit 25 and the second redundancy signal $y_2$ are fed to the input of a second constituent decoder 26, which may be constructed, for example, as a Viterbi decoder. A decoded signal 33 is fed back again via a feedback 27 and a de-interleave unit 28 disposed therein to the input of the first decoder 23. To this extent, the decoding device 20 according to the invention is similar to a decoding device known from the prior art shown in FIG. 2.

In contrast to the known decoding device, the decoding device 20 according to the invention has, however, a device 32 for performing a cyclic redundancy check (CRC) following every iteration run. The quality of the decoded signal 33 can be checked with the aid of the CRC. If the CRC reveals that the data frame under consideration of the decoded signal 33 is not error-free and that the decoded signal 33 does not therefore have the specified quality (as yet), the decoded signal 33 is fed back via the feedback 27 to the input of the first decoder 23 and is decoded once again within the framework of a further iteration.

If the data frame of the decoded signal 33 is, however, error-free, the decoded signal 33 is emitted as estimated hard bits 31 via a threshold detector 29 for converting the soft output of the decoder 26 into a hard output and a further de-interleave unit 30.

Figure 3:
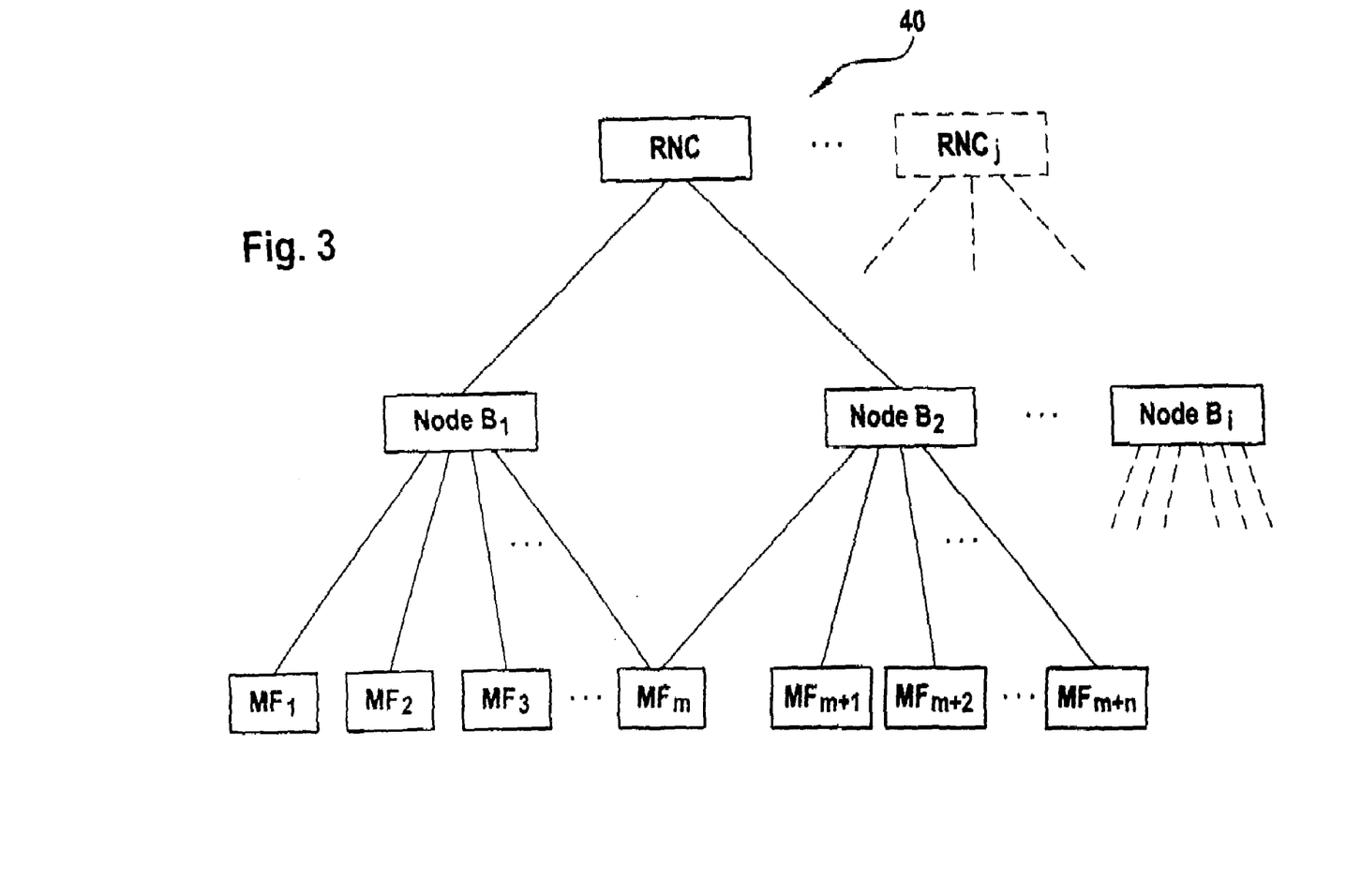
FIG. 3 shows a block diagram of a radio telecommunications system according to the invention.

The decoding device 20 according to the invention is also described as a turbo decoder. Such a turbo decoder can be used in a base station node B of a radio telecommunications system 40 (cf. FIG. 3). The radio telecommunications system shown in FIG. 3 complies with the UMTS standard and comprises a multiplicity of mobile-radio units $MF_1$ to $MF_m$ and $MF_{m+1}$ to $MF_{m+n}$, a multiplicity of base stations node $B_1$, node $B_2$ that are in radio contact with the mobile-radio units MF. In addition, the UMTS radio telecommunications system 40 comprises a control device constructed as radio network controller (RNC) for controlling the radio telecommunications system 40. The control device RNC is connected to the base stations node $B_1$, node $B_2$. The radio telecommunications system 40 can be expanded almost as desired (cf. broken lines in FIG. 3; node $B_i$, $RNC_i$).

The decoding device 20 according to the invention shown in FIG. 1 is implemented on a digital signal processor (DSP). Depending on the DSP used, only a certain number of iterations can be performed within a time period under consideration (so-called transmission timing interval frame, TTI frame). In the present exemplary embodiment, a DSP of the TigerSHARC type having a clock rate of 180 MHz is used that can perform ten iterations within a TTI frame. Following the TTI frame, the next data frame of the subsequent TTI frame of the received signal 21 is already present for decoding at the input of the decoding device 20.

With a signal-to-interference ratio of the received signal 21 of about 1 dB, the device according to the invention can achieve on average about a 70% saving in computing effort for the individual DSPs. This saving in computing effort is achieved in that a full eight iterations are not performed, as is standard, in the case of the decoding device 20, but the number of iterations is determined as a function of need. If, for example, a received signal 21 is already error-free after two iterations, the decoding can be terminated without quality loss even then, that is to say before running all eight iterations. After terminating the decoding, the DSP is in a so-called idle state and is available for other tasks, for example for reducing the loading on other DSPs. According to the invention, three strategies are proposed for a better capacity utilization of the DSPs of a decoding device. The proposed strategies are denoted as Z, W and $Z^+$ strategies. They are explained below in detail.

Figure 4:
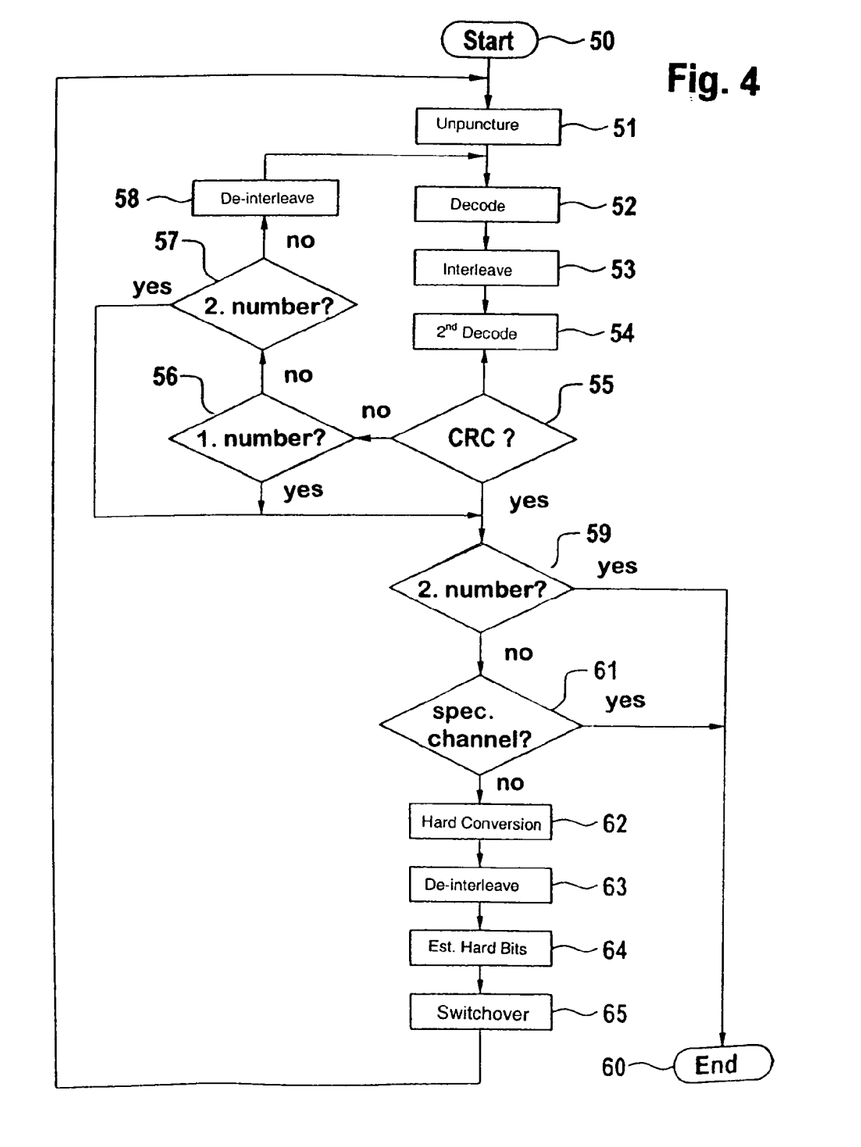
FIG. 4 shows a flowchart of a decoding method according to the invention.
Figure 5:
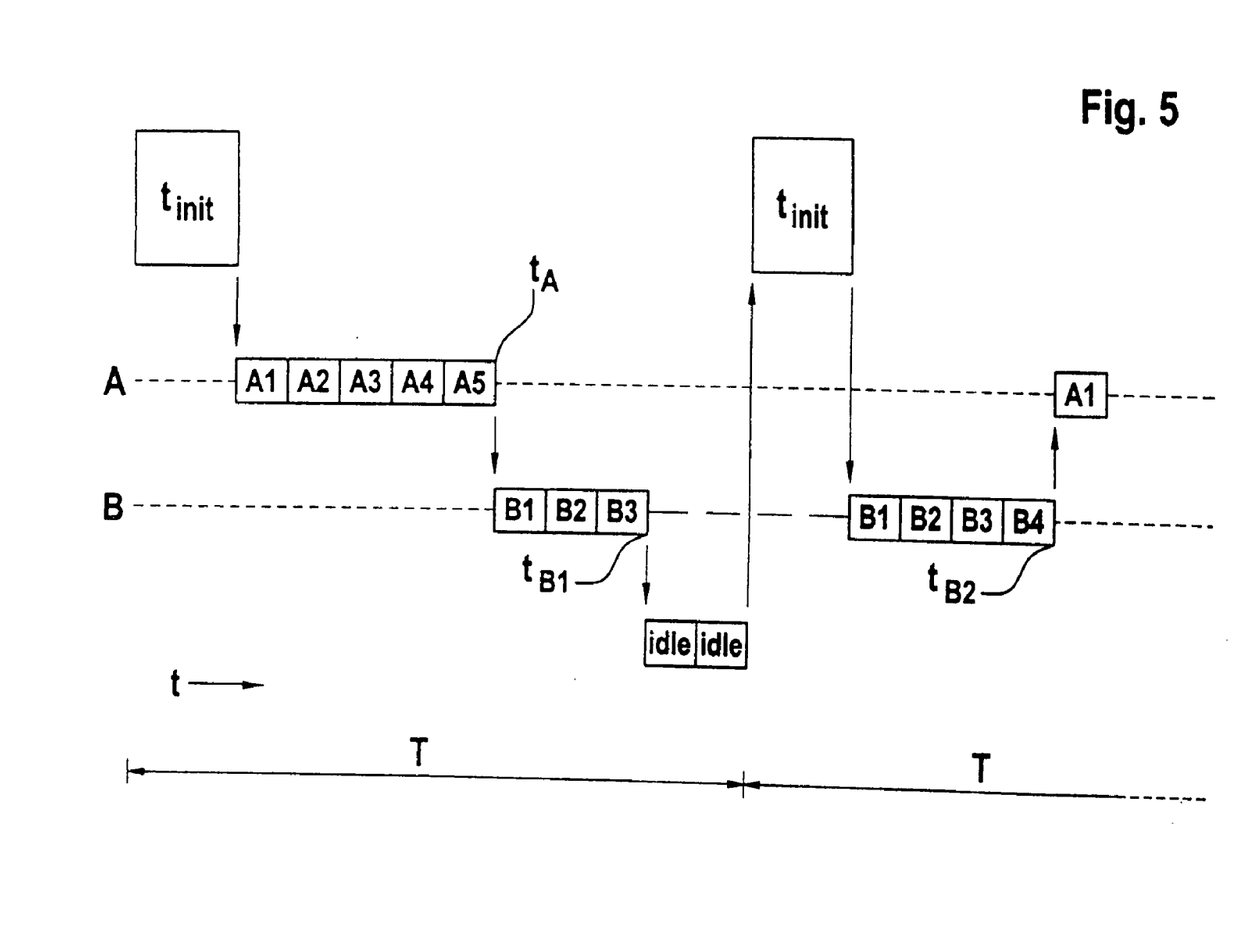
FIG. 5 shows a method according to the invention in accordance with a first preferred embodiment.

FIG. 4 describes a flowchart of a decoding method according to the invention for the so-called Z-strategy (cf. FIG. 5). The method according to the invention starts in a function block 50. The so-called unpuncturing is then performed in a function block 51. This function is undertaken by the unpuncturing and demultiplexing unit 22. The unpuncturing is part of a rate matching and essentially comprises (expressed in simplified form) the insertion of bits omitted in the frame of the radio transmission into the data frame with an amplitude zero. In a function block 52, a first decoding of the input signal 21 performed by the first decoder 23 is then executed.

In a function block 53, the output signal 24 of the first decoder 23 is rearranged so that bits originally adjacent in the data frame are disposed as far away from one another as possible. This function is executed by the interleave unit 25.

Although the error rate of the received signal 21 transmitted in the data frame under consideration remains the same as a result of rearranging the bits in the function block 53, defective bits are disposed so as to be distributed over the entire data frame. As a result, a possible error correction can be decisively improved in the subsequent second decoder 26. In a downstream function block 54, the further decoding executed in the second decoder 26 then takes place.

In a scanning block 55, a cyclic redundancy check (CRC) is executed over a decoded signal 33 contained in the data frame under consideration and whether the decoded signal 33 is error-free or not is checked. If the decoded signal 33 is error-free (CRC OK), the decoding method of the data frame transmitted via the channel under consideration can already be terminated after this first iteration. If the decoded signal 33 is not, however, error-free (CRC NOK), branching takes place to a scanning block 56 in which a check is made as to whether a specifiable first number of iterations, in the present exemplary embodiment eight iterations, has already been executed for the data frame under consideration of the channel under consideration. If that is so, the decoding of the data frame under consideration is terminated for the channel under consideration after the eight iterations already executed and a branching is carried out to scanning block 59, although the decoded signal 33 transmitted via the channel under consideration is not error free. Otherwise, branching is made to a further scanning block 57 in which whether, within a time period under consideration, a specifiable second number of iterations, in the present exemplary embodiment ten iterations, has been executed in total for the data frames of all the channels under consideration. If that is so, the decoding is likewise terminated for the data frame under consideration of the channel under consideration and branching takes place to the scanning block 59.

Otherwise, branching takes place to a function block 58 in which the rearrangement, executed in the function block 53, of the bits of the data frame under consideration is nullified. This function is undertaken by the de-interleave unit 28 in the feedback 27.

Branching then again takes place to the function block 52, in which a further decoding of the signal 33 already decoded by means of an iteration takes place in the first decoder 23. Iterations for the data frame under consideration of the channel under consideration are executed until the decoded signal 33 is error-free (scanning block 55), until eight iterations have been carried out for the data frame under consideration (scanning block 56) or until ten iterations have been executed in total (scanning block 57), within the TTI frames under consideration, for all the data frames of all the channels under consideration.

Whether ten iterations have already been executed in total for all the data frames of all the channels under consideration is checked in scanning block 59. If so, the method has to be terminated in a function block 60 since data frames of the next TTI frame are already present for decoding at the input of the decoding device 20. Otherwise, branching takes place to a scanning block 61 in which whether data frames of channels allocated to this DSP have been decoded is checked. If the data frames of all the channels have been decoded, the method is likewise terminated. Otherwise, branching takes place to a function block 62 with which the soft output of the second decoder 26 from the function block 54 is converted into a hard output. This is either the physical bits 1, −1 or the logic bits 0, 1. This function is implemented by the threshold-value generator 29. Then, the rearrangement of the bits contained in the data frame under consideration from the function block 53 is nullified in a function block 63. This function is implemented in the de-interleave unit 30 of the decoding device 20. The estimated hard bits 31 are then emitted in a function block 64. Finally, a switchover takes place to a further channel in a function block 65. Branching then takes place again to the function block 51 and the method according to the invention is run again for the further channel.

FIG. 5 shows the so-called Z-strategy. The time interval under consideration that is available to the DSP for decoding the input signals transmitted in data frames via the channels (TTI frame) is denoted by the reference symbol T. The channels A and B are assigned to the DSP. At the start of the time interval T under consideration, the decoding device 20 is initialized, which initialization comprises, for example, the initialization of a so-called Rake receiver, such as is used to receive code division multiple access (CDMA) radio signals, and the initialization of the interleave units 28, 30. The time needed for initialization is denoted by $t_{init}$. The Z-strategy shown in FIG. 5 starts at channel A with the decoding of the data frame under consideration. A1 to A5 denote the consecutively executed iterations for decoding the received signal 21 transmitted in the data frame under consideration of the channel A. After five iterations, the data frame under consideration is error free at the instant in time $t_A$. The computing capacity still available on the DSP within the TTI frame T is sufficient for five further iterations of a decoding. The computing capacity is used to decode a data frame of the channel B. Switchover takes place to the channel B and the data frame under consideration is decoded in a plurality of iterations B1 to B3. Following three iterations, at the instant in time $t_{B1}$, the decoded signal 33 transmitted in the data frame under consideration of channel B is error-free. For the remaining two iterations, the DSP is free, i.e. in an idle state.

The DSP is then available again for the subsequent TTI frame T for decoding further data frames of the channels A, B. At the start of the time interval T under consideration, the decoding device 20 is again initialized for the time period $t_{init}$. This time, the decoding method starts at a data frame transmitted via the channel B. The received signal 21 transmitted via the data frame under consideration is error-free after four iterations at the instant in time $t_{B2}$. Switchover then takes place to the channel A and the decoding of the data frame A starts with the first iteration A1.

Figure 6:
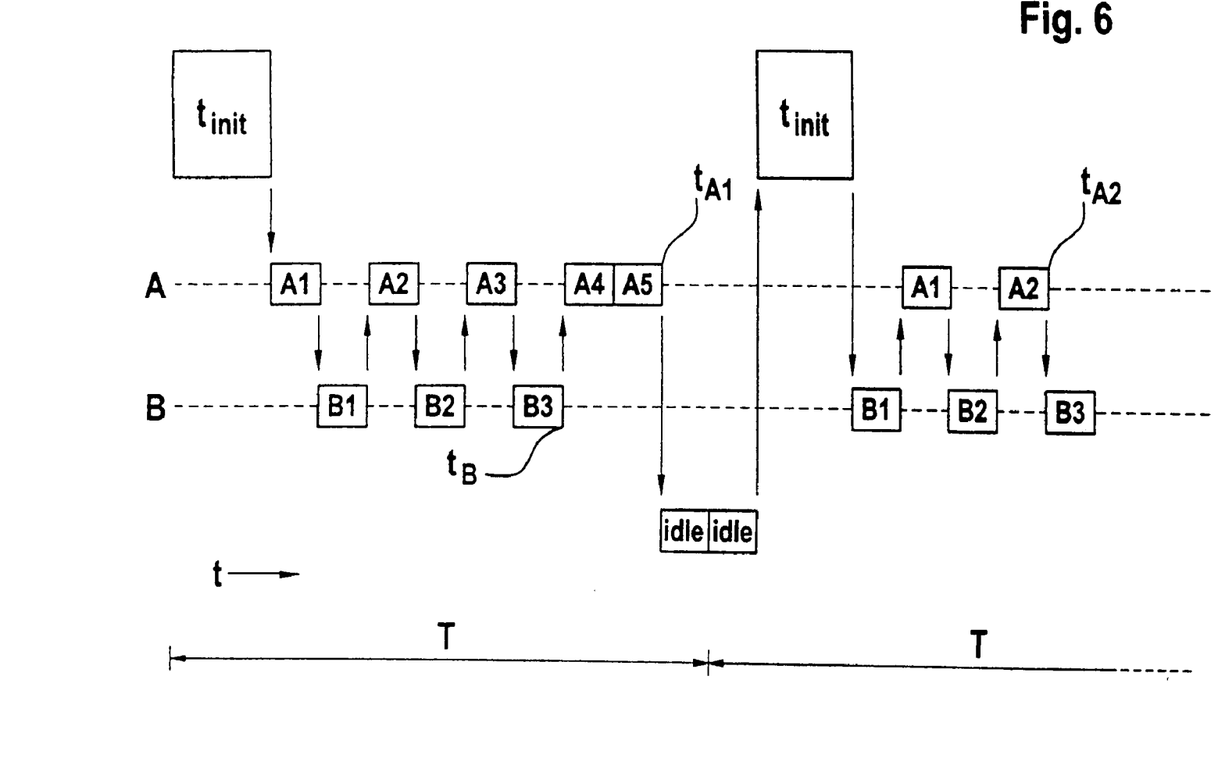
FIG. 6 shows a method according to the invention in accordance with a second preferred embodiment.

FIG. 6 shows a second preferred embodiment of the method according to the invention. The method shown in FIG. 6 is described as W-strategy. The W-strategy can prevent a disadvantage of the Z-strategy, namely that, if the decoding is started of a received signal having relatively severe interference, the decoding of the relevant data frame requires almost all the iterations available within the TTI frame T and only a few iterations are still available for data frames of the further channel. If the data frame of the further channel contains interference beyond a very small extent, the remaining iterations are with high probability not sufficient for decoding the data frame of the further channel until error-free. If, for example, in the Z-strategy, the decoding of the data frame of the channel A requires a full eight iterations (the worst case being assumed), only two iterations are available for decoding the further data frame of the channel B. This disadvantage is eliminated by the strategy described.

In the W-strategy, switchover takes place (as is evident from FIG. 6) to the other channel after every iteration. This has the result that (to return to the worst case described above) at least five iterations are executed for the data frame of the further channel even if the data frame of the first channel is subject to severe interference. The probability that a data frame is decoded after five iterations so that it is error-free is substantially higher in the case of the W-strategy than after only two iterations in the case of the Z-strategy. It is, however, to be noted that the Z-strategy is superior to the W-strategy in certain cases. If, for example, two channels are assigned to a DSP for decoding and six iterations are needed in each case for decoding the data frames of the two channels with a maximum of ten iterations available, this has the result in the case of the W-strategy that both data frames cannot be decoded until error-free and have consequently to be discarded. On the other hand, with the Z-strategy, at least one of the two data frames is decoded until error-free.

In the exemplary embodiment from FIG. 6, an initialization of the decoding device 20 is executed again at the start of the TTI frame T under consideration for the time period $t_{init}$. The decoding of the data frame of the channel A is then started. After the first iteration A1, switchover takes place to the channel B and the decoding of the data frame of the channel B is started. Switchover again takes place after an iteration B1 to the channel A, where the decoding of the data frame A is interrupted with the second iteration A2. In this way, switchover takes place cyclically between the channel A and the channel B for every iteration following every iteration until a decoded signal 33 transmitted via the channel A or B under consideration is error free. In the present exemplary embodiment, the decoded signal transmitted via the channel B is error-free after three iterations at the time instant $t_B$. Switchover then again takes place to the channel A and the remaining computing capacity of the DSP is fully utilized for the decoding of the data frame transmitted via the channel A. The data frame of the channel A is error-free after two further iterations, that is to say after five iterations in total, at the time instant $t_{A1}$. The DSP is then in the idle state for a further two cycles.

To decode the subsequent data frames of the channels A, B, the decoding of the data frame transmitted via the channel B is started and switchover again takes place for every iteration between the channels A, B following every iteration. The data frame transmitted via the channel A is error-free after two iterations at the time instant $t_{A2}$. Subsequent thereto, transfer takes place to the channel B and the computing capacity of the DSP still available within the TTI frame T under consideration is fully used for decoding the data frame transmitted via the channel B.

Figure 7:
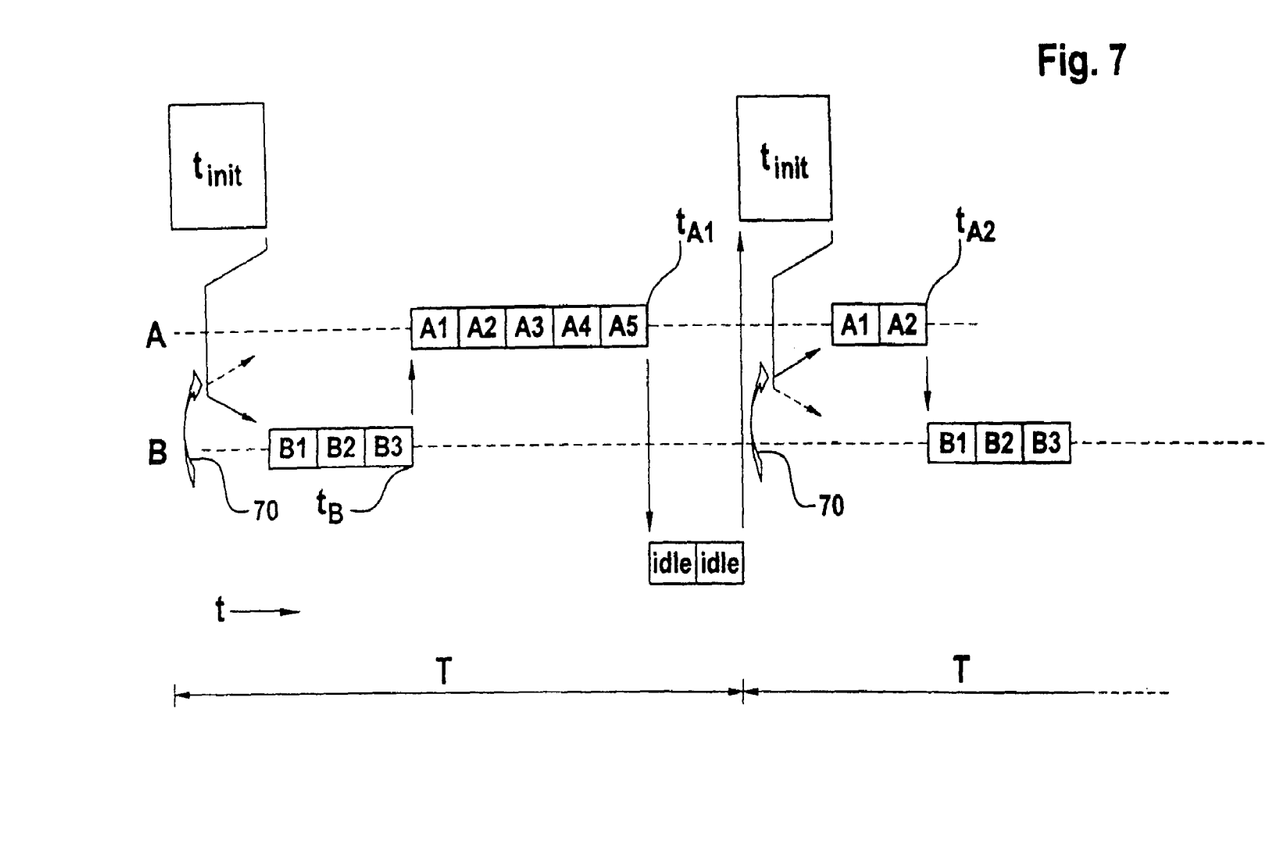
FIG. 7 shows a method according to the invention in accordance with a third preferred embodiment.

FIG. 7 shows a third preferred exemplary embodiment of the method according to the invention. Said exemplary embodiment is described as $Z^+$-strategy. The $Z^+$-strategy is essentially similar to the Z-strategy shown in FIG. 5. The $Z^+$-strategy differs from the Z-strategy, however, in that the decoding method is started on that channel via which the received signal 21 is transmitted with the best quality factor. This has the advantage that, in particular, if switchover takes place between more than two channels within the framework of the decoding method, as many data frames as possible, namely the data frames least subject to interference, can be decoded until error-free within the TTI frame T available.

Items of information about the quality factor of the transmitted received signal 21 can be obtained from various sources. Thus, for example, it is conceivable to determine the quality factor of the received signals 21 on the basis of a signal-to-noise ratio (signal-to-interference ratio, SIR) of the received signals 21. In UMTS radio telecommunications systems, the SIR is determined as standard, for example for the purpose of matching the transmitting power of the mobile-radio units. The SIR can be used without great effort to select the first channel for performing the method according to the invention. The quality factor of the received signal may, however, also be determined on the basis of the bit error rate of pilot bits in a dedicated physical control channel (DPCCH) of the received signals 21.

In the exemplary embodiment from FIG. 7, the decoding device 20 is first initialized at the start of the TTI frame T for the time period $t_{init}$. Subsequent thereto, that channel is selected from the two channels A, B via which the received signal 21 is transmitted with the better quality factor. The selection of the channel is symbolized by an arrow 70 and is implemented in the decoding device 20 by the unit 22. In the present exemplary embodiment, the received signal 21 is transmitted via channel B with the best quality factor and the decoding method begins with channel B. After three iterations B1 to B3, the data frame transmitted via the channel B is error free at the time instant $t_B$. Switchover then takes place to channel A, where the data frame transmitted via the channel A is decoded. The data frame of the channel A is error free after five iterations A1 to A5 at the time instant $t_{A1}$. The DSP is in the idle state within the TTI frame T under consideration for a further two iterations.

To decode the data frame present in the subsequent TTI frame T of the channels A, B, an initialization $t_{init}$ of the decoding device 20 is again first executed. A selection 70 than takes place of that channel via which the received signal 21 is transmitted with the best quality factor. In the TTI frame T now under consideration, the signal 21 is best transmitted via the channel A and the decoding method starts with the channel A. The data frame transmitted via the channel A is error-free after two iterations A1, A2, at the time instant $t_{A2}$. Switchover takes place to the channel B, where the decoding of the data frame transmitted via the channel B is started.

The invention claimed is:

1. Iterative method of decoding received signals transmitted in data frames via a plurality of channels by means of a digital signal processor, wherein the plurality of channels are assigned to the digital signal processor, starting with a first channel, a quality of a decoded signal transmitted via the first channel is checked following every decoding iteration, and the digital signal processor is switched over to at least one further channel of the plurality of channels if a specified switchover condition is fulfilled,
wherein a cyclic redundancy check is performed for every decoded data frame transmitted via the first channel following every decoding iteration;
wherein the switchover condition is that a decoded data frame transmitted via the first channel is error-free; and wherein a first number of decoding iterations for the first channel is specified and
the digital signal processor is switched over to at least one further channel of the plurality of channels if a specified first number of decoding iterations has been performed for a decoded data frame of the first channel.

* * * * *